United States Patent
Lai et al.

(10) Patent No.: US 8,079,005 B2
(45) Date of Patent: Dec. 13, 2011

(54) METHOD AND SYSTEM FOR PERFORMING PATTERN CLASSIFICATION OF PATTERNS IN INTEGRATED CIRCUIT DESIGNS

(75) Inventors: Ya-Chieh Lai, Sunnyvale, CA (US); Frank E. Gennari, San Jose, CA (US); Matthew W Moskewicz, San Mateo, CA (US); Junjiang Lei, San Jose, CA (US); Weinong Lai, Fremont, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 528 days.

(21) Appl. No.: 12/241,409

(22) Filed: Sep. 30, 2008

(65) Prior Publication Data

US 2010/0083208 A1    Apr. 1, 2010

(51) Int. Cl.
*G06F 17/50* (2006.01)
(52) U.S. Cl. ........... 716/111; 716/52; 716/112; 716/118
(58) Field of Classification Search ................. 716/100, 716/101, 104, 106, 110, 111, 118, 119, 132, 716/52, 112
See application file for complete search history.

(56) References Cited

U.S. PATENT DOCUMENTS

| 7,653,892 | B1 * | 1/2010 | Gennari et al. | 716/50 |
| 7,760,347 | B2 * | 7/2010 | Nehmadi et al. | 356/237.4 |
| 7,818,707 | B1 * | 10/2010 | Gennari et al. | 716/53 |
| 7,831,942 | B1 * | 11/2010 | Gennari et al. | 430/30 |
| 2006/0269120 | A1 | 11/2006 | Nehmadi et al. | |

OTHER PUBLICATIONS

Ma, N. et al, "Automatic hotspot classification using pattern-based clustering," Design for Manufacturability through Design-Process Integration II, Proc. of SPIE vol. 6925, 692505, 2008.

* cited by examiner

*Primary Examiner* — Sun Lin
(74) *Attorney, Agent, or Firm* — Vista IP Law Group, LLP

(57) ABSTRACT

Disclosed is an approach for performing pattern classification for electronic designs. One advantage of this approach is that it can use fast pattern matching techniques to classify both patterns and markers based on geometric similarity. In this way, the large number of markers and hotspots that typically are identified within an electronic design can be subsumed and compressed into a much smaller set of pattern families. This significantly reduced the number of patterns that must be individually analyzed, which considerably reduces the quantity of system resources and time needed to analyze and verify a circuit design.

29 Claims, 16 Drawing Sheets

| Pattern | Matches | Markers | Marker Coverage | Category |
|---|---|---|---|---|
| 0 | 940 | 884 | 0.940 | [Sensitive] |
| 1 | 1062 | 493 | 0.464 | [Inconclusive] |
| 2 | 40 | 40 | 1.000 | [Dead] |
| 3 | 65 | 43 | 0.662 | [Inconclusive] |
| 4 | 27 | 2 | 0.074 | [Inconclusive] |
| 5 | 21 | 4 | 0.190 | [Inconclusive] |
| 6 | 6 | 2 | 0.333 | [Inconclusive] |
| 7 | 400 | 8 | 0.020 | [Inconclusive] |
| 8 | 6 | 6 | 1.000 | [Dead] |
| 9 | 4 | 4 | 1.000 | [Dead] |
| 10 | 20 | 8 | 00.40 | [Inconclusive] |

FIG. 11

METHOD AND SYSTEM FOR PERFORMING PATTERN CLASSIFICATION OF PATTERNS IN INTEGRATED CIRCUIT DESIGNS

BACKGROUND AND SUMMARY

The invention is directed to a more efficient approach for performing pattern classification with respect to patterns in integrated circuit designs.

A semiconductor integrated circuit (IC) has a large number of electronic components, such as transistors, logic gates, diodes, wires, etc., that are fabricated by forming layers of different materials and of different geometric shapes on various regions of a silicon wafer. The various components of an integrated circuit are initially defined by their functional operations and relevant inputs and outputs. From the HDL or other high level description, the actual logic cell implementation is typically determined by logic synthesis, which converts the functional description of the circuit into a specific circuit implementation.

An integrated circuit designer may use a set of EDA application programs to create a physical integrated circuit design layout from a logical circuit design. The EDA application uses geometric shapes of different materials to create the various electrical components on an integrated circuit and to represent electronic and circuit IC components as geometric objects with varying shapes and sizes. During this process, the design components are "placed" (i.e., given specific coordinate locations in the circuit layout) and "routed" (i.e., wired or connected together according to the designer's circuit definitions).

After an integrated circuit designer has created the circuit layout, verification and/or optimization operations are performed on the integrated circuit layout using a set of EDA testing and analysis tools. These actions are performed since significant variations from the as-designed IC product may occur to the as-manufactured IC product due to the optical and/or chemical nature of the processing used to manufacture the integrated circuit. For example, optical distortions during the lithography process may cause variations in feature dimensions (e.g. line widths) that are patterned using masks. Physical verification would occur to help identify areas of significant risks for problematic variations.

Many physical verification tools create markers at the location of potential violations. The problem is that there are often a very large number of these markers. It is difficult for either a human or an automated program to efficiently review these results and to perform analysis upon these markers. For example, one area of particular interest is the result of performing manufacturing hotspot analysis, where a verification tool is employed to check an electronic design for locations of potential manufacturability or printability problems (referred to as "hotspots"). Using such a tool, e.g., in combination with one or more respective models, the verification tool would identify and mark locations on the design in which there is a potential problem that would result when that design is manufactured. However, if the verification tool identifies millions of these locations and correspondingly inserts markers at all of those locations, and if it is necessary to inspect and analyze each and every one of those marked location, and if a certain amount of time is required to analyze those locations, then a large and excessive amount of time and system resources may be needed to analyze that design and those markers.

To address these problems, among others, the present invention in some embodiments provides an approach for performing pattern classification for electronic designs. One advantage of this invention is that it can use fast pattern matching techniques to classify both patterns and markers based on geometric similarity. In this way, the large number of markers and hotspots that typically are identified within an electronic design can be subsumed and compressed into a much smaller set of pattern families. This significantly reduced the number of patterns that must be individually analyzed, which considerably reduces the quantity of system resources and time needed to analyze and verify a circuit design.

BRIEF DESCRIPTION OF FIGURES

FIG. 11 shows an example chart of hypothetical statistical results from performing pattern classification on a layout according to some embodiments of the invention.

DETAILED DESCRIPTION

The present approach is directed to a method, system, and computer readable medium for performing pattern classification for electronic designs. One advantage of this invention it that it can use fast pattern matching techniques to classify both patterns and markers based on geometric similarity. In this way, the large number of markers and hotspots that typically are identified within an electronic design can be subsumed and compressed into a much smaller set of pattern families. This significantly reduced the number of patterns that must be individually analyzed, which considerably reduces the quantity of system resources and time needed to analyze and verify a circuit design.

The advantage of using geometric similarity is that there is often a large amount of geometric redundancy. This type of similarity can result in compression of information so there is less for a human to review. Further, geometric similarity is something that is intuitive to a human.

This approach can compress information better than alternative approaches, such as an approach that takes the output from a lithography hotspot checker and then groups the markers based on edge placement error numbers and/or whether it is a necking or bridging error. The present approach can also compress information better than the other alternative approach of using the design hierarchy to group hotspots, e.g., to report where in the hierarchy a violation occurred so that it is only reported once in the event this cell is repeated many times. N. Ma et al, "Automatic hotspot classification using pattern-based clustering," Proc. SPIE, vol. 6925, 692505, 2008 describes an example of an alternative implementation. Some advantages of the present embodiments over these alternative approaches is that the present embodiments are more efficient at converting a large set of markers into a smaller and/or more useful set of bins in a reasonable amount of time, and that the classifications of the present approach based upon geometric similarity provides a more useful set of results.

To illustrate embodiments of the invention and their advantages, this document will illustrate its teachings particularly with respect to hotspots corresponding to potential lithography problems. It is noted, however, that the invention may be applied in other contexts as well and will be applicable to other classes of manufacturability checks and issues, such as DRC, CMP, etch, etc.

Figure 1:
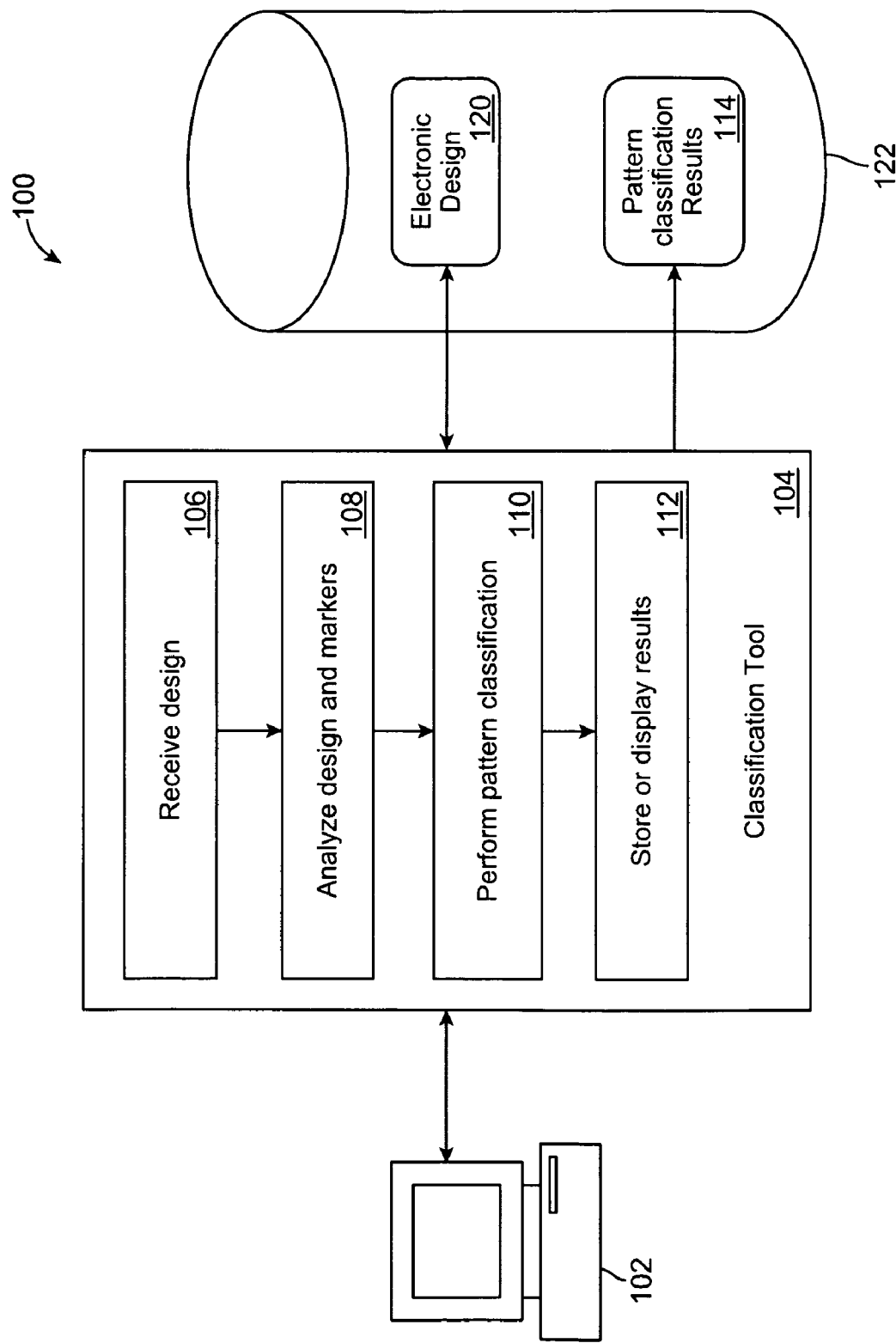
FIG. 1 illustrates a high level architectural diagram of an example system 100 with which the invention may be implemented.

FIG. 1 illustrates a high level architectural diagram of an example system 100 with which the invention may be implemented. A user at a user station 102 utilizes an electronic design tool 104, e.g., a pattern classification tool, to analyze and classify identified patterns within one or more electronic designs 120.

The classification tool 104 generally operates by receiving the electronic design 120 from an electronic design database 122 (106). The electronic design 120 is analyzed with respect to identified layout portions within the electronic design (108). According to one embodiment, the layout portions to be analyzed correspond to layout portions that have been marked or in some way associated with a marker, e.g., based upon markers planted by a lithography checker tool to identify lithography/printability hotspots.

Pattern classification is preformed to create groupings or families of patterns (110). A bin that is the output of this classification is representative of a family of marker types. Some criteria that can be used to create a marker family include, for example, 1) maximize shared central rectangles across a family 2) allowing for geometric variations within the family 3) minimizing coverage of non-markers 4) using tolerances to represent variation 5) use image correlation to either allow or restrict grouping of markers.

Thereafter, results of the pattern classification process are displayed to the user at user station 102 or stored as classification results 114 within the electronic design database 122 (112).

One advantage of some embodiments is that the pattern families or bins created by the invention are themselves search patterns that can be used to do further analysis. These search patterns can be used by a pattern matcher to perform searches back on the original layout or on other layouts. One useful result of this approach is that it can be used to find other similar regions in the layout which are potentially problematic, some of which may not have been flagged by the original verification program. In addition, this allows one to perform fast checking of layout using matching for the same or similar types of violations, where the technique is fast because it does not involve another round of simulation.

Figure 2:
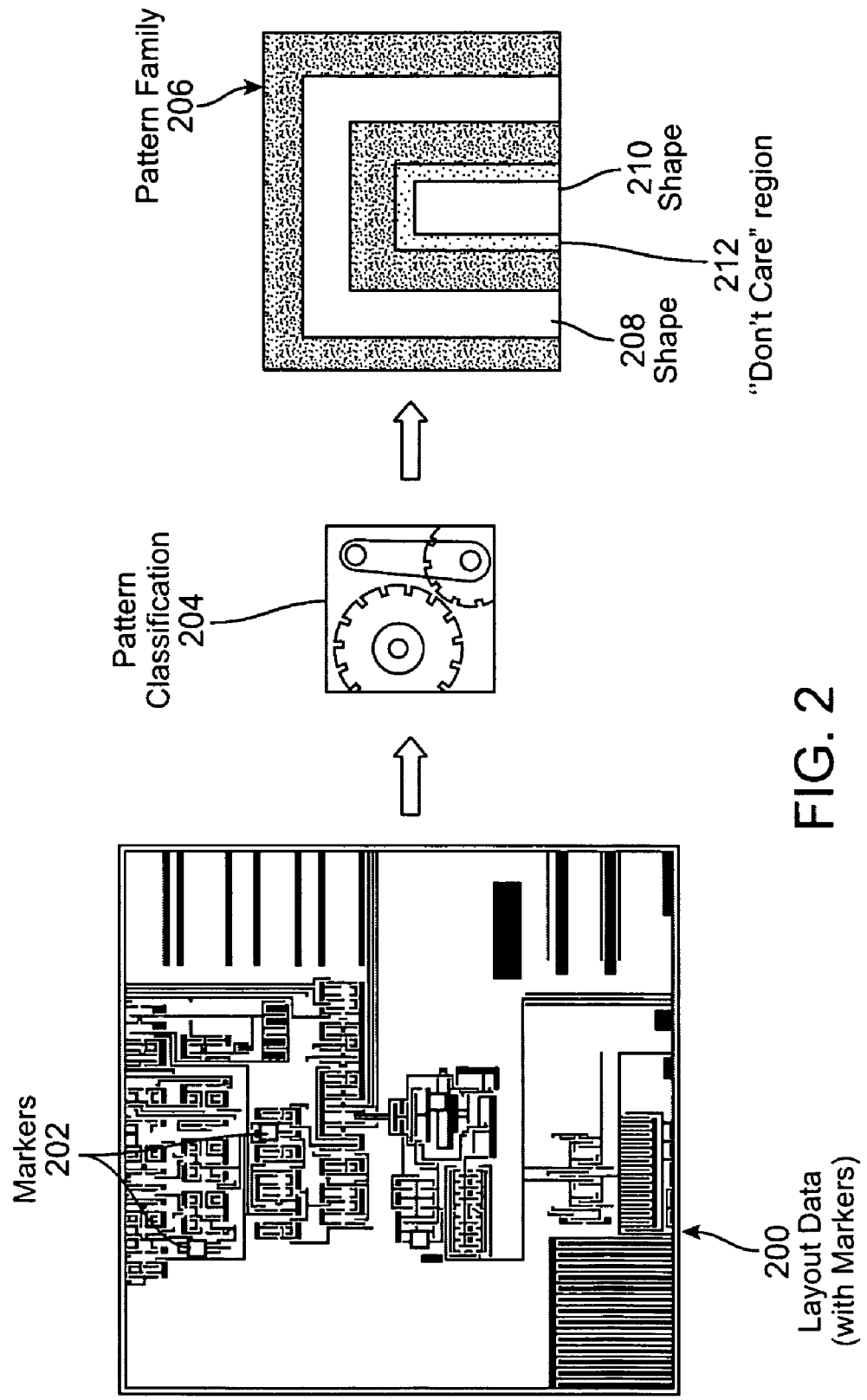
FIG. 2 generally shows the concept of pattern classification according to an embodiment of the invention.

FIG. 2 generally shows the concept of pattern classification according to an embodiment of the invention. The figures provide an example illustration of layout data 200 with markers 202 attached or associated with that data 200. Each "error" marker identifies a portion of the electronic design layout that is associated with a location of a potential manufacturing problem. For example, the markers could be associated with a lithography hotspot, where he markers are identified by performing lithography simulation to determine locations within the layout that would have a printing problem under a manufacturing process. When performing lithography checking operations on a large circuit design, it is possible that a very large number of markers 202, e.g., millions of markers, could be inserted into the layout data 200.

The goal is to perform pattern classification 204 to reduce the large number of markers 202 to a much smaller and more manageable group of pattern families 206. This simplifies the process of reviewing and analyzing large amounts of data from a layout. In addition, this provides a knowledge base that can be used to create pattern-based design rules to both implement a new circuit design and to perform pattern-based design verification.

The pattern families 206 correspond to pattern parameters that are defined to group related patterns together. According to some embodiments, the pattern families are configured such that patterns that are within a defined geometric similarity or that do not exceed certain geometric variations will be grouped within the same pattern family.

FIG. 2 illustrates an example of a pattern family 206 that includes two shapes 208 and 210. The pattern comprises shape 208, which is a U-shaped feature that surrounds shape 210, which is a line end feature. The pattern families can be defined to have flexibility with regards to the geometric attributes of its shape members. For example, the dimensions of line-end shape 210 can be flexible, with the definition of the pattern family 206 specifying a "don't care" region 212 around shape 210. This means that any similar pattern having a line-end shape 210 with dimensions that fall anywhere within the don't care region 212 will be classified as being part of pattern family 206.

According to some embodiments, pattern clustering is performed to perform pattern classification. In effect, patterns are compared to determine if multiple patterns are similar enough such that they should be grouped or clustered within the same pattern family. The following are examples of suitable criteria that can used to cluster markers: (1) mirror and rotational folding; (2) translational folding; (3) image correlation; and (4) edge registration. Each of these clustering approaches is described in more detail below.

Mirroring and rotational folding are used to perform clustering for patterns which are geometrically similar, but for which the patterns themselves may be mirrored or rotationally folded relative to other patterns.

Figure 3:
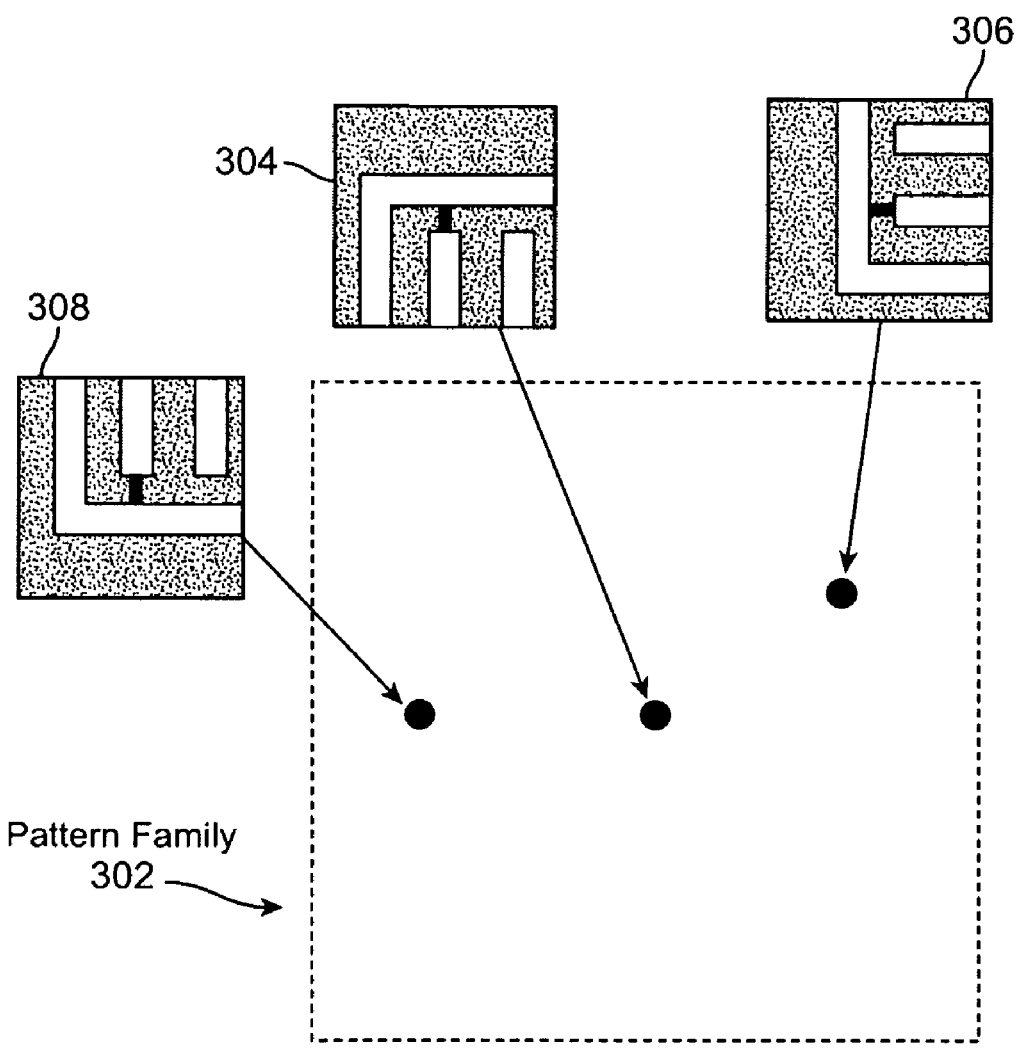
FIG. 3 illustrates mirroring and rotational folding according to an embodiment of the invention.

This approach is illustrated in the pattern family 302 shown in FIG. 3. Pattern family 302 includes a pattern 304 having the illustrated configuration of geometric features. For this example, a cluster is formed around pattern 304.

Pattern 308 is a vertically mirrored version of pattern 304, having a geometric feature configuration that is identical (or similar within a specified tolerance) to the geometric feature configuration of pattern 304, except for the mirroring. As such, this forms the basis for clustering pattern 304 and pattern 308 within the same pattern family 302.

Pattern 306 is a rotated version of pattern 304, in which pattern 306 has a pattern that is counter-clockwise ninety degree rotated from the feature configuration of pattern 304. Otherwise, pattern 306 has a geometric feature configuration that is identical (or similar within a specified tolerance) to the geometric feature configuration of pattern 304, except for the rotation. As such, this forms the basis for clustering pattern 306 and pattern 308 within the same pattern family 302.

According to some embodiments, clustering by mirroring and rotational folding is accomplished by starting with the location of the marker within an identified pattern. From the location of that marker, each object associated with that marker is analyzed, and incrementally reviewed from a mirrored or rotationally shifted perspective relative to objects within another pattern to consider if the other pattern has the same or similar configuration. If all objects for the pattern are similarly positioned relative to the marker to an acceptable degree, but have been merely mirrored or rotationally translated, then the patterns can be classified to be in the same pattern family. According to some embodiments, 90 degree rotations are supported for Manhattan-based layouts. Alternatively, any suitable angular translations can be supported to use mirroring and rotational folding to perform pattern clustering.

Translational folding is used to perform clustering for patterns which are geometrically similar, but for which the features themselves within the pattern may be shifted by an acceptable tolerance level such that they should still be classified within the same pattern family. This is useful, for example, because even for multiple patterns that share the exact same geometry, it is possible that the marker is not always located at the same place or even at the same size relative to the identical geometry.

Figure 4:
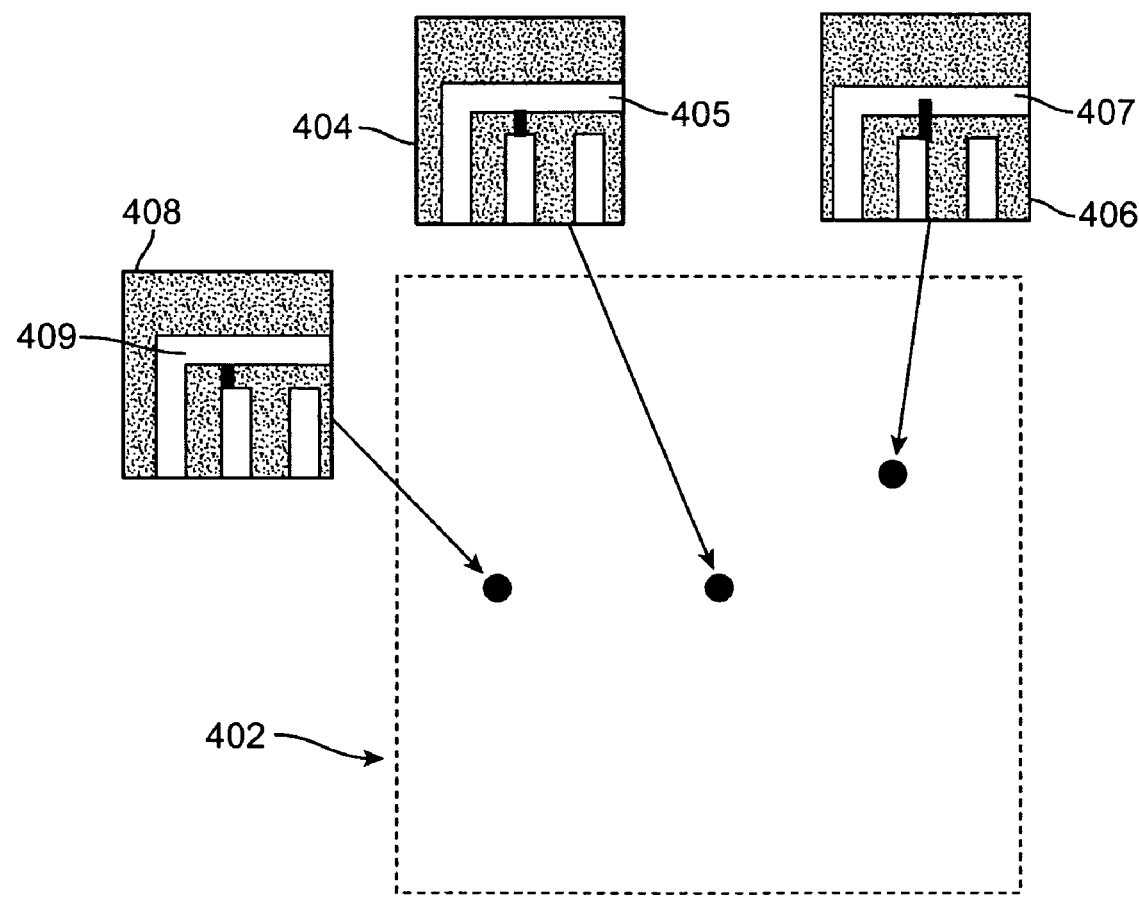
FIG. 4 illustrates translational folding according to an embodiment of the invention.

This approach is illustrated in the pattern family 402 shown in FIG. 4. Pattern family 402 includes a pattern 404 having the illustrated configuration of geometric features. In particular, it is advised to note the relative position of marker 405 within pattern 404. For this illustrated example of pattern family 402, a cluster is formed around pattern 404.

Pattern 408 has a geometric feature configuration that is identical (or similar within a specified tolerance) to the geometric feature configuration of pattern 404. However, it is noted that marker 409 within pattern 408 is positioned within the pattern differently from the way marker 405 is positioned in pattern 404. Therefore, relative to the markers 405 and 409 within the patterns 404 and 408, the patterns would not appear "identical" although they are geometrically the same.

In this circumstance, both pattern 408 and pattern 404 could be clustered within the same pattern family 402. This type of clustering is accomplished according to some embodiments by determining whether pattern 404 matches pattern 408 if translated by up to a specified translational threshold, e.g., as specified in nanometers. It is noted in this example that the geometries are windowed around the centers of each marker. However, the present approach can be used even if the markers are not the centering locations.

In a similar manner, pattern 406 can be analyzed to determine if it should belong to the same cluster as pattern 404, and thereby be classified within the same pattern family 402. It can be seen within FIG. 4 that the marker 407 within pattern 406 is positioned within the pattern differently from the way marker 405 is positioned in pattern 404, even though the patterns themselves are geometrically the same. Therefore, relative to the markers 405 and 407 within the patterns 404 and 406, the patterns would not appear identical although they are geometrically the same. Here, assuming the two patterns 404 and 406 are the same within the translational threshold, both patterns should be clustered within the same family 402. The distance between patterns 404 and 406 can be any suitable distance, but can be up to two times the translational threshold according to some embodiments.

Image correlation is used to perform clustering to identify patterns which are not exactly the same from a geometric perspective, but which are similar enough such that they should be classified within the same pattern family for analysis purposes. There are numerous criteria that can suitably be used to determine that two patterns are close enough to be clustered together. One example approach is to perform clustering purely on a geometric basis, to identify patterns that are geometrically similar to one another within a certain correlation tolerance level. Another possible approach is to determine whether two images are identical or similar from a lithographic perspective, that is whether two images that have differing geometric configurations will nevertheless lithographically print out to form identical or similar patterns. For example, prior to performing the correlation comparison, the geometry can be convolved with an optical kernel. For purposes of illustration, the present examples will be described with respect to pure geometric comparisons of patterns, although the invention is not so limited and can be implemented using any suitable approach.

Figure 5:
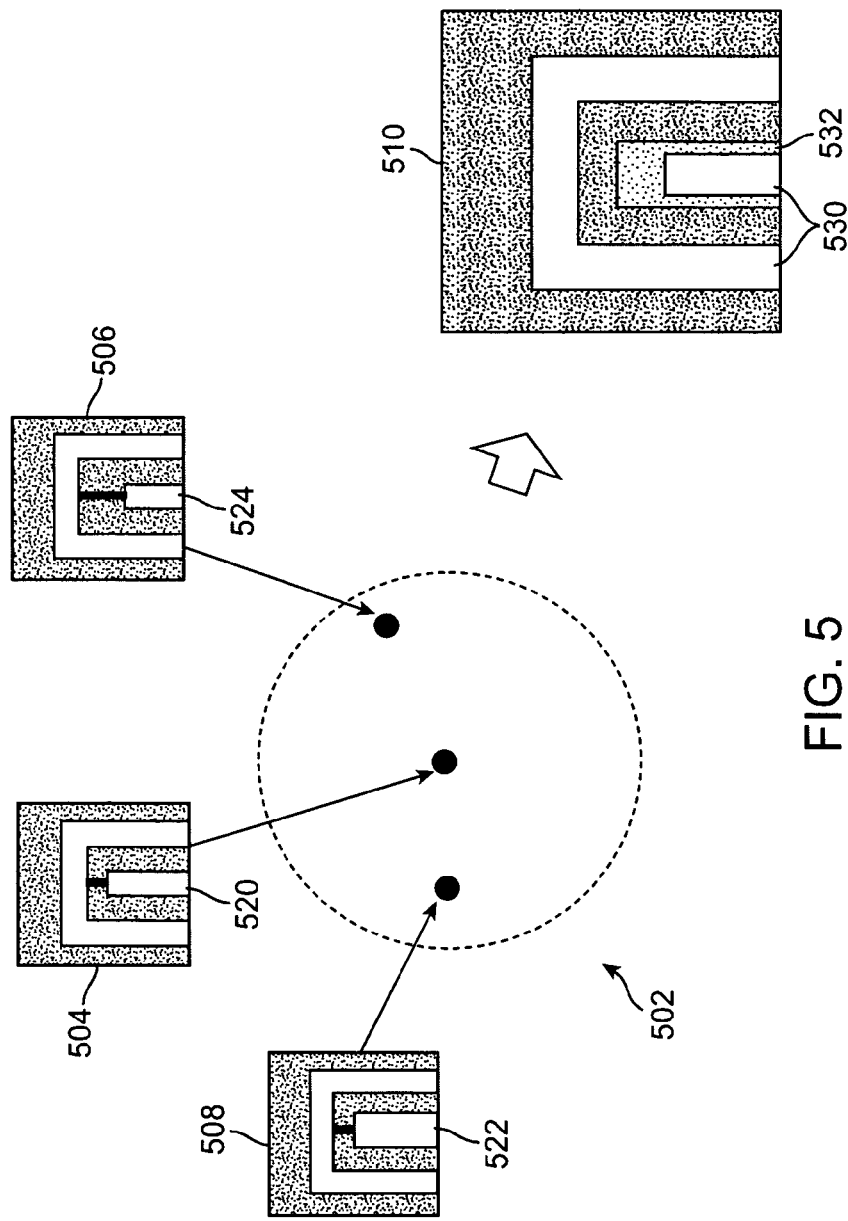
FIG. 5 illustrates image correlation according to an embodiment of the invention.

This image correlation approach is illustrated with respect to pattern family 502 shown in FIG. 5. Pattern family 502 includes a pattern 504 having the illustrated configuration of geometric features. For this illustrated example of pattern family 502, a cluster is formed around pattern 504.

A specified match factor or percentage is used to determine whether the images for two patterns sufficiently correlate such that they should be classified within the same pattern family. According to some embodiments, image correlation is preformed by performing a Boolean OR between two patterns, and then comparing the amount or degree of overlap (or non-overlap) between the two patterns. If the overlap or non-overlap percentage or amount meets a certain threshold, then the two patterns correlate to the same pattern family. On the other hand, if the amount or degree of overlap/non-overlap does not meet the specified threshold, then the two patterns do not correlate together and should not be clustered within the same pattern family.

In the present example, pattern 504 has a geometric feature configuration having a line end feature 520 of a certain length and width. Pattern 506 has a line end feature 524 with a length that is shorter than the length of line end feature 520 of central clustering pattern 504. In this example, it was assumed that the specified match factor allows both patterns 504 and 506 to be correlated and clustered within the same pattern family 502.

In a similar manner, assume it has been determined that the image for pattern 508 has been correlated to the image of pattern 504. Pattern 508 has a line end feature 522 with a width that is wider than the width of line end feature 520 of central clustering pattern 504. In this example, it was assumed that the specified match factor allows both patterns 504 and 508 to be correlated and clustered within the same pattern family 502.

According to some embodiments, a cluster is represented by a single pattern 510 that includes both a shared geometry portion 530 and a "don't care" portion 532. The "don't care" portion 532 defines a region in which the corresponding shape call fall within that region and still correlate to the pattern. This allows the pattern family to be defined to have flexibility with regards to the geometric attributes of its shape members.

According to some embodiments, the correlation delta between the two farthest patterns within the pattern family (e.g., patterns 506 or 508) can be up to two times the correlation delta between either pattern to the central clustering pattern (i.e., pattern 504).

Edge registration is used to perform clustering to identify patterns which differ only by the locations of one or more edges within the pattern. If the edges differ within a specified tolerance level, then the patterns are classified within the same pattern family for analysis purposes.

Figure 6:
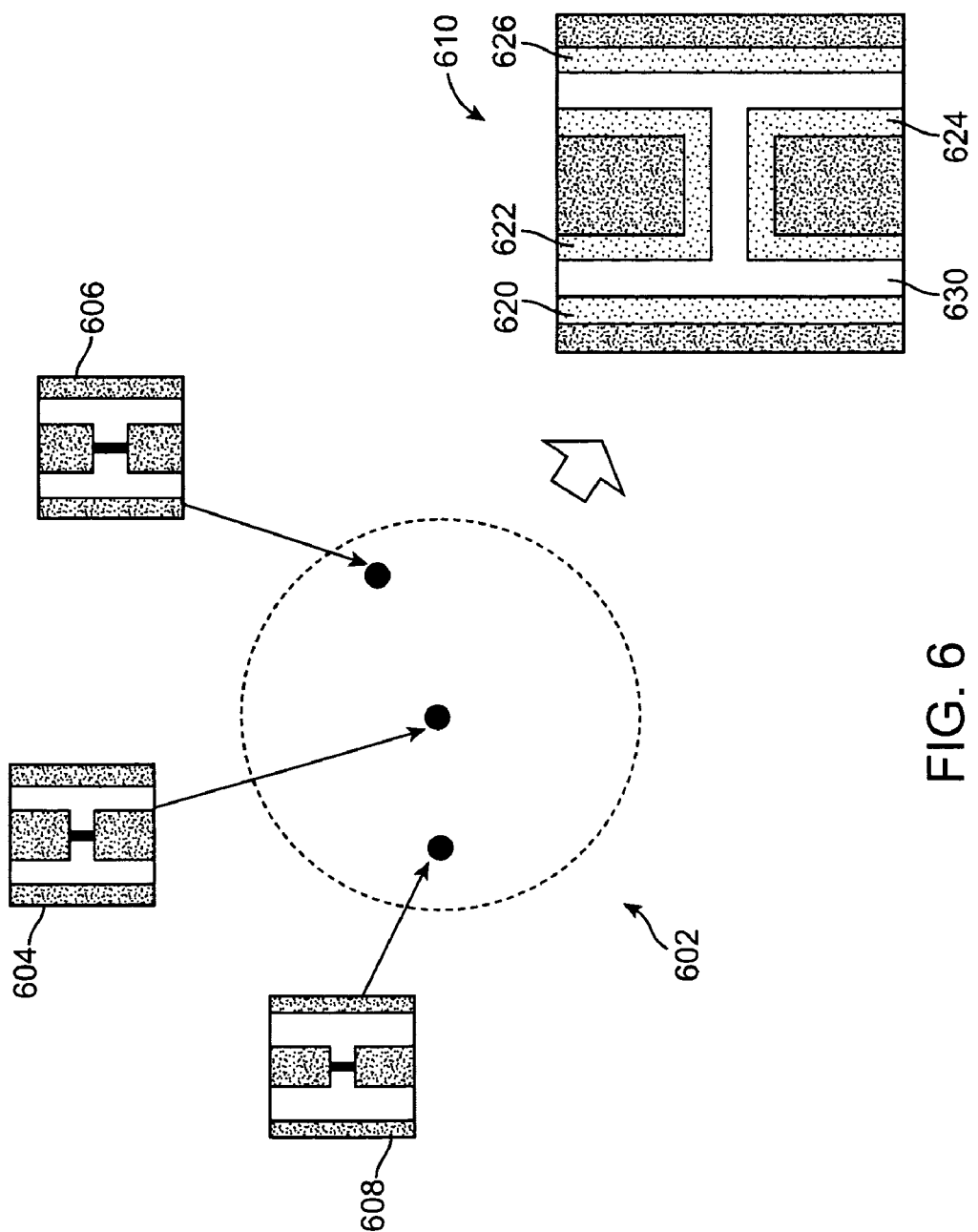
FIG. 6 illustrates edge registration according to an embodiment of the invention.

The edge registration approach is illustrated with respect to pattern family 602 shown in FIG. 6. Pattern family 602 includes a pattern 604 having the illustrated configuration of geometric features. For this illustrated example of pattern family 602, assume that a cluster is formed around pattern 604.

According to some embodiments, a cluster is represented by a single pattern 610 that includes one or more shared geometry portions 630 (displayed with the white color). The cluster also include one or more "don't care" portions within the pattern, which define variations in the pattern that nevertheless still allow the pattern to correlate to the pattern family. For the edge registration approach, the don't care portions correspond to allowed edge movements for edges in the pattern. For example, "don't care" portion 620 corresponds to the left edge of the shape 630, where the Width of portion 620 expresses the specified tolerance for movement of the left edge of the pattern. Similarly, "don't care" portion 626 corresponds to the right edge of the shape 630, where the width of portion 626 expresses the specified tolerance for movement of the right edge of the pattern. "Don't care" portions 622 and 624 correspond to the tolerance levels for movements of the upper, lower, and inner edges for shape 630. If a pattern has an image that falls within either the shape of the shared geometry portion 630 or within the "don't care" portions for the cluster pattern 610, then that pattern is classified within the pattern family 602.

In the present example, it is assumed that both patterns 606 and 608 have geometric features having edges that, while not exactly the same configuration as the edges in pattern 604, nevertheless fall within the tolerance of the "don't care" regions of the cluster representation 610. As a result, both patterns 606 and 608 are classified within the same pattern family 602 as pattern 604.

According to one embodiment, some or all of the above pattern matching approaches can be implemented using the "Trie" data structure, which is a type of tree structure for storing and analyzing data. The data elements corresponding to the layout objects are extracted and stored within the Trie structure, wherein the objects are sorted by distance relative to the marker. The tree structure would be traversed in order to perform searching and analysis for the pattern matching techniques described above, wherein the analysis spirals outwards from the marker/root of the tree in a non-quadratic manner. Binning or groupings of the shapes is accomplished by a traversal, e.g., hierarchical traversal, of the tree. A depth-first approach can be taken to the traversal of the tree. New situations (where a situation is a geometric context around a marker) are pulled into the tree in a recursive manner, such that pursuing the analysis to the end of a branch corresponds to a full situation. According to one approach, analysis for multiple markers can be collected together for the same or similar situation.

Figure 7:
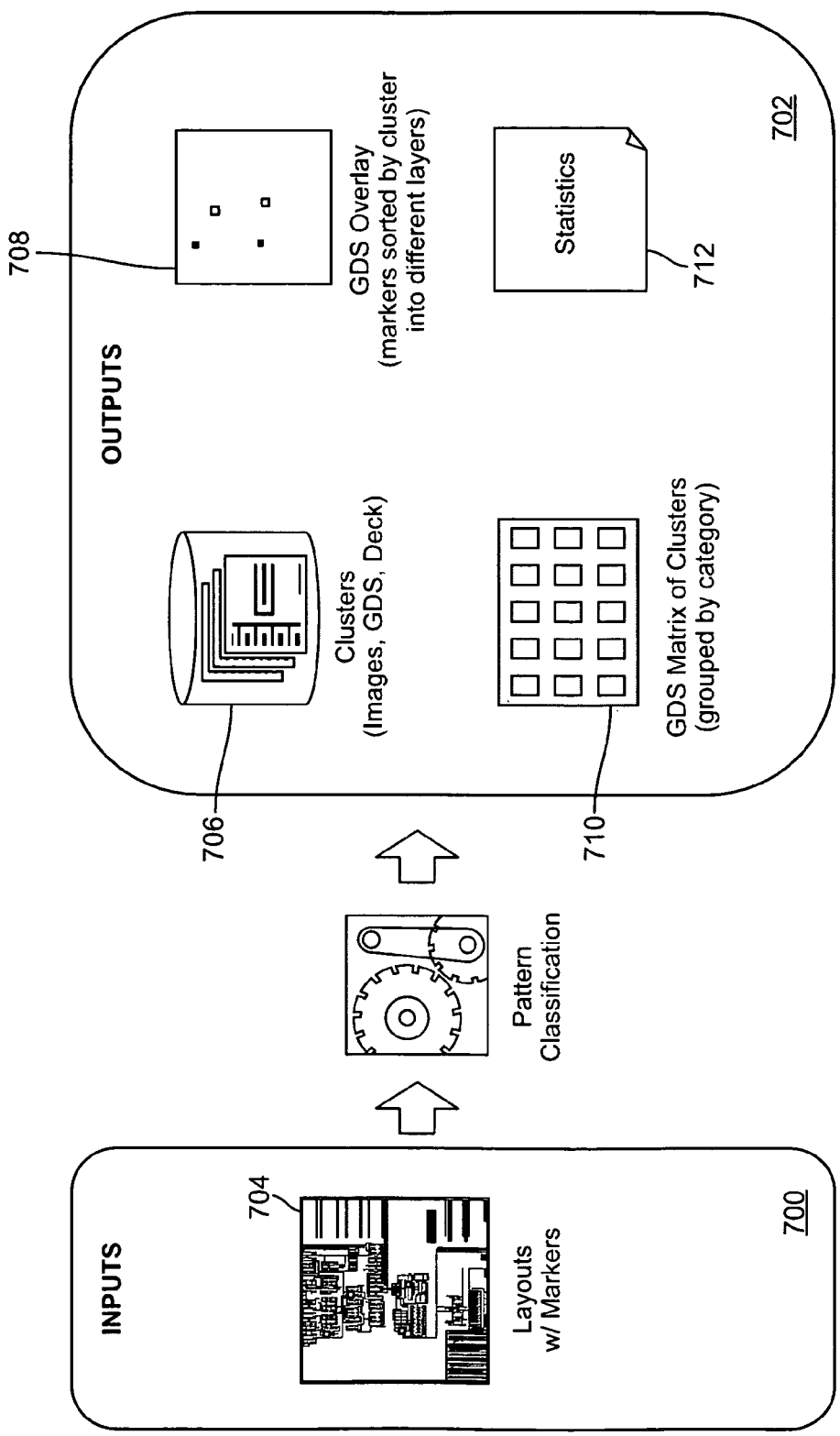
FIG. 7 shows an overview of example input data and example output data for the present pattern classification method/system according to some embodiments of the invention.

FIG. 7 shows an overview of example input data and example output data for the present pattern classification method/system according to some embodiments of the invention. As previously noted, the pattern classification inputs 700 include layout data 704 having markers corresponding to portions of the layout that may be problematic from a manufacturing or printability perspective. The pattern classification outputs 702 include, for example, clustering data 706, layout overlay data 708, matrix data 710 for the clusters, and statistics 712. Each of these example outputs are described in more detail below.

Figure 8:
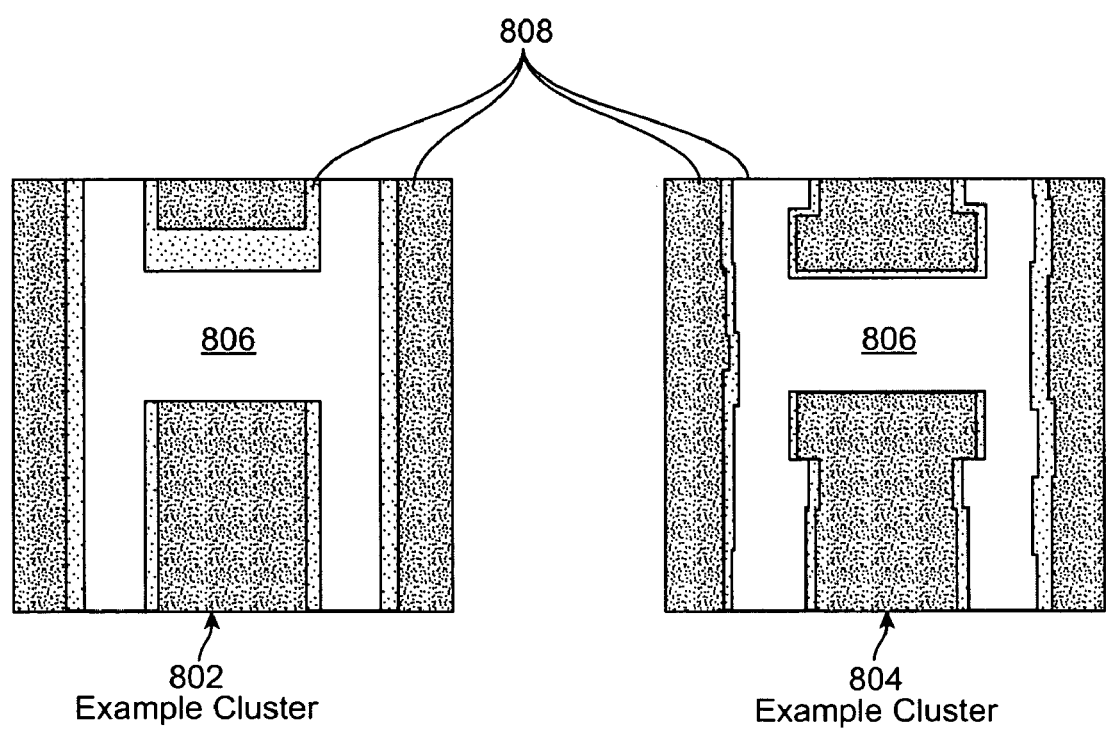
FIG. 8 shows example clusters according to some embodiments of the invention.

Clustering data 706 represents the pattern families, clusters, or "bins" used to groups related patterns together. According to some embodiments, clustering data 706 comprises the stored graphical representations of each cluster, e.g., as PNG images or as GDS clips. FIG. 8 illustrates two example clusters 802 and 804. In the graphical representations for clusters 802 and 804, the white-colored portions 806 correspond to shared geometries within the clusters. The shaded portions 808 correspond to "don't care" geometry within the clusters.

The clusters can be stored as a group of clusters within a "deck", and stored in a library or distributed to be used by downstream tools. Such downstream tools can include, for example, tools to implement an electronic design that would check the patterns in the deck when performing layout, placement, or routing functions, to avoid implementing certain patterns within the layout, i.e., to avoid implementing patterns corresponding to known hotspots that have been classified and stored within the deck. The downstream tools can also include verification tools that would perform pattern matching with the deck to check a layout for problematic designs. The cluster representations could be implemented with the correct format usable by designated pattern search engines, e.g., as a valid search pattern. For example, U.S. patent application Ser. No. 11/207,266, filed on Aug. 18, 2005 and U.S. patent application Ser. No. 11/609,901, filed on Dec. 12, 2006, which are both hereby incorporated by reference in their entirety, disclose pattern search methods/systems that can be suitably employed in conjunction with the present invention, and for which a cluster implementation can be formatted with respect to its disclosed pattern search/match approach.

With respect to layout overlay data 708, it is possible that the original layout data includes markers that were placed onto one or more layers of the design. For data manipulation or review purposes, it is more efficient to group markers associated with the same cluster onto the same layer of the design.

This is accomplished according to some embodiments by creating a layout overlay such that markers associated with the same cluster are sorted, grouped, and placed on the same layer of the design. For layout in the GDS format, this involves the creation of a GDS overlay file, in which the markers are sorted by clusters into different layers.

Figure 9:
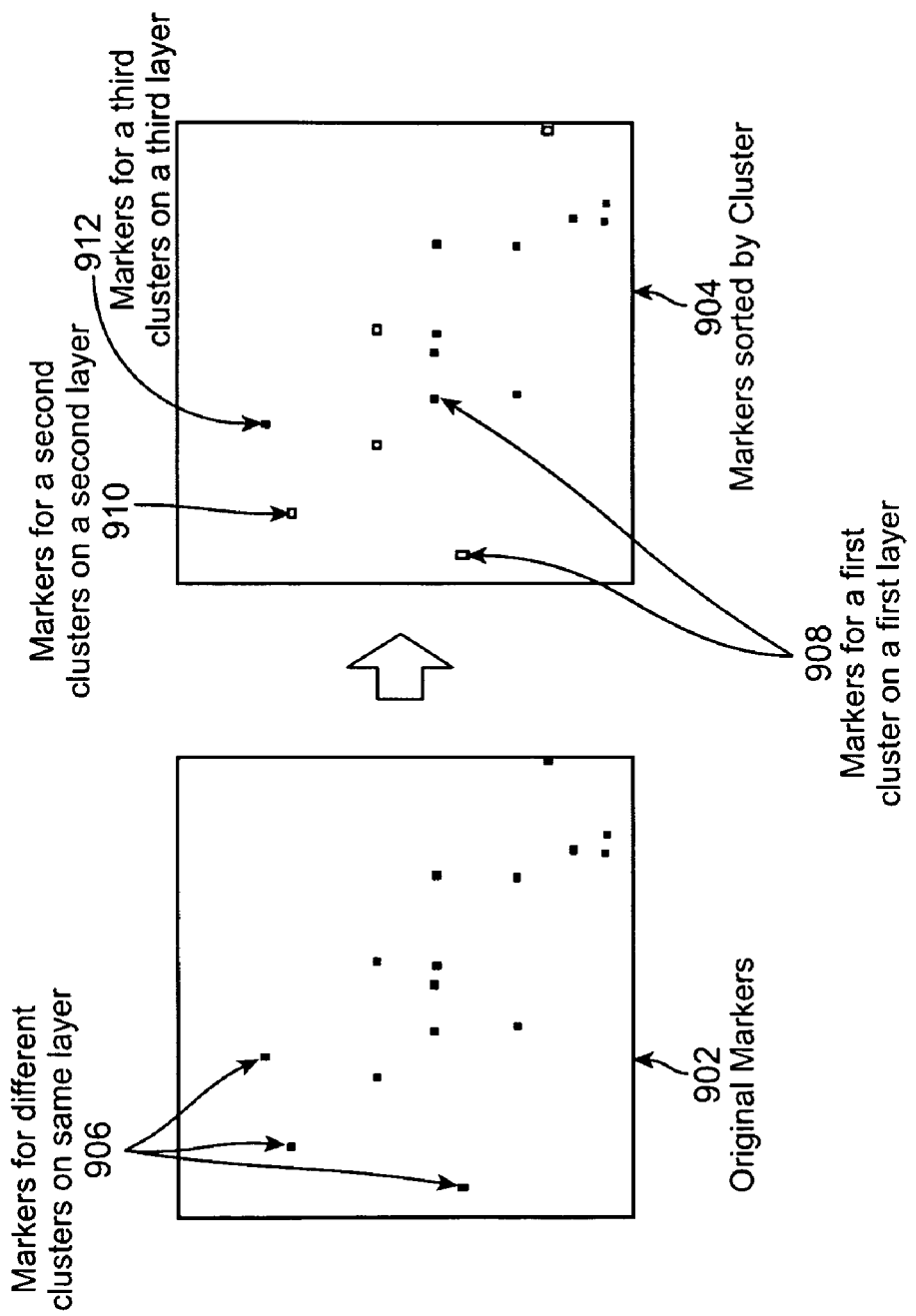
FIG. 9 illustrates a layout overlay according to some embodiments of the invention.

This is graphically illustrated in FIG. 9 which a layout 902 having the original markers. The left side of the figure shows the markers in layout 902 on the same layer 906, even though the markers may correspond to different clusters. The right side of the figure shows the markers sorted by cluster in layout 904. In particular, the markers for a first cluster are sorted and placed onto a first cluster layer 908. Similarly, the markers for a second cluster are sorted and placed onto a second cluster layer 910 and the markers for a third cluster are sorted and placed onto a third cluster layer 912.

Figure 10:
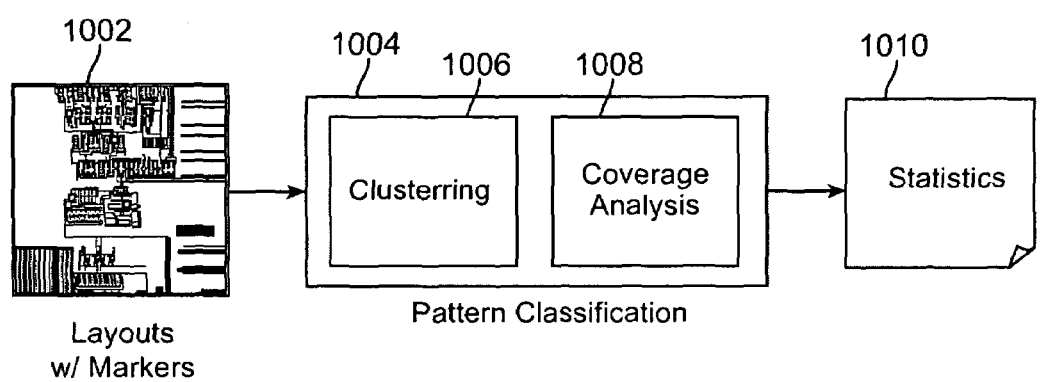
FIG. 10 shows a flow of a process for gathering statistics according to some embodiments of the invention.

The statistics 712 refer to statistical data that can be collected and generated based upon performing the pattern classification. FIG. 10 shows a flow that can be used to gather statistics according to some embodiments of the invention. The process receives the layout data 1002 with markers as the input to the pattern classification action 1004. Within the pattern classification action 1004, clustering 1006 is performed against the layout data, e.g., as described above. In addition, coverage analysis 1008 is performed against the clustered data to generate the statistics 1010.

Numerical data that is useful for performing coverage analysis is gathered and analyzed to check the scope and degree of coverage for the clustered patterns. Examples of information that can be gathered for this analysis (and also stored within statistics 1010) include: (1) the number of matches of a pattern family within the layout; (2) the number of markers covered by those matches; and (3) the marker coverage ratio. The marker coverage ratio can be defined according to some embodiments as the ratio of the number of markers to the number of matches (# markers/# matches).

Based upon this type of analysis, the clusters can be organized into different categories. The following are example categories that can be used to organize the clusters:

1. Dead: This refers to a category in which every (or substantially every) match in the layout covers a marker;
2. Sensitive: This refers to a category in which the marker coverage ratio is greater than or equal to a specified tolerance (but less than in the dead category);
3. Inconclusive: This refers to category in which the marker coverage ratio is less than a specified tolerance; and
4. Not enough markers: This category corresponds to when a cluster is covered by too few markers, and therefore may not be able to provide statistically reliable conclusions.

FIG. 11 shows an example chart of hypothetical statistical results from performing pattern classification on a layout. Each row of the chart corresponds to a unique cluster. The chart includes first column 1110 to identify the pattern family identifier for the cluster of a given row. Column 112 identifies the number of matches for that pattern. Column 1114 identifies the number of markers for the pattern. Column 1116 shows the marker coverage for the pattern. Column 1118 identifies the classification category for the pattern based upon the statistical analysis.

Row 1106 provides an example of a "dead" pattern, in which every match in the layout covers a marker. This can be seen in row 1106 by the fact that there are exactly 40 matches (column 1112) and also exactly 40 markers (column 1114). As a result, the marker coverage ratio is 1 (column 1116). Pattern families in this category tend to provide very good predictive capabilities because all or most matches of the pattern family are markers.

Row 1102 provides an example of a "sensitive" pattern, where not all matches in the layout covers a marker, but for which the marker coverage ratio exceeds a defined threshold. For example, if the user specified threshold is 75% for a sensitive pattern, then row 1102 qualifies since the marker coverage ratio is 94% (as can be seen from column 1116). Depending upon the selection of a good threshold level, this category may also provide very good predictive capabilities as well.

Row 1104 provides an example of an "inconclusive" pattern, in which the marker coverage ratio falls below the defined threshold. If the user specified threshold is 75% for an inconclusive pattern, then row 1104 qualifies since the marker coverage ratio is 46.4% (as can be seen from column 1116). This means that the marker coverage ratio may be too small to draw very good predictions from the pattern Row 1108 corresponds to a "dead" pattern, but it is noted that the sample size is rather small for this pattern. This can be seen in row 1108 by the fact that there are only 4 matches (column 1112) and also only 4 markers (column 1114). According to one embodiment, a sample size threshold can be set to determine whether a given sample size is too small to generate conclusions.

Returning back to FIG. 7, another output of the classification process is a grouping or "matrix" 710 of the clusters. All clusters can be placed into a single layout file or can be placed into separate files based on the category to which they belong. Grouping clusters into their own categories can aid in both manual review and downstream automated processing.

Figure 12:
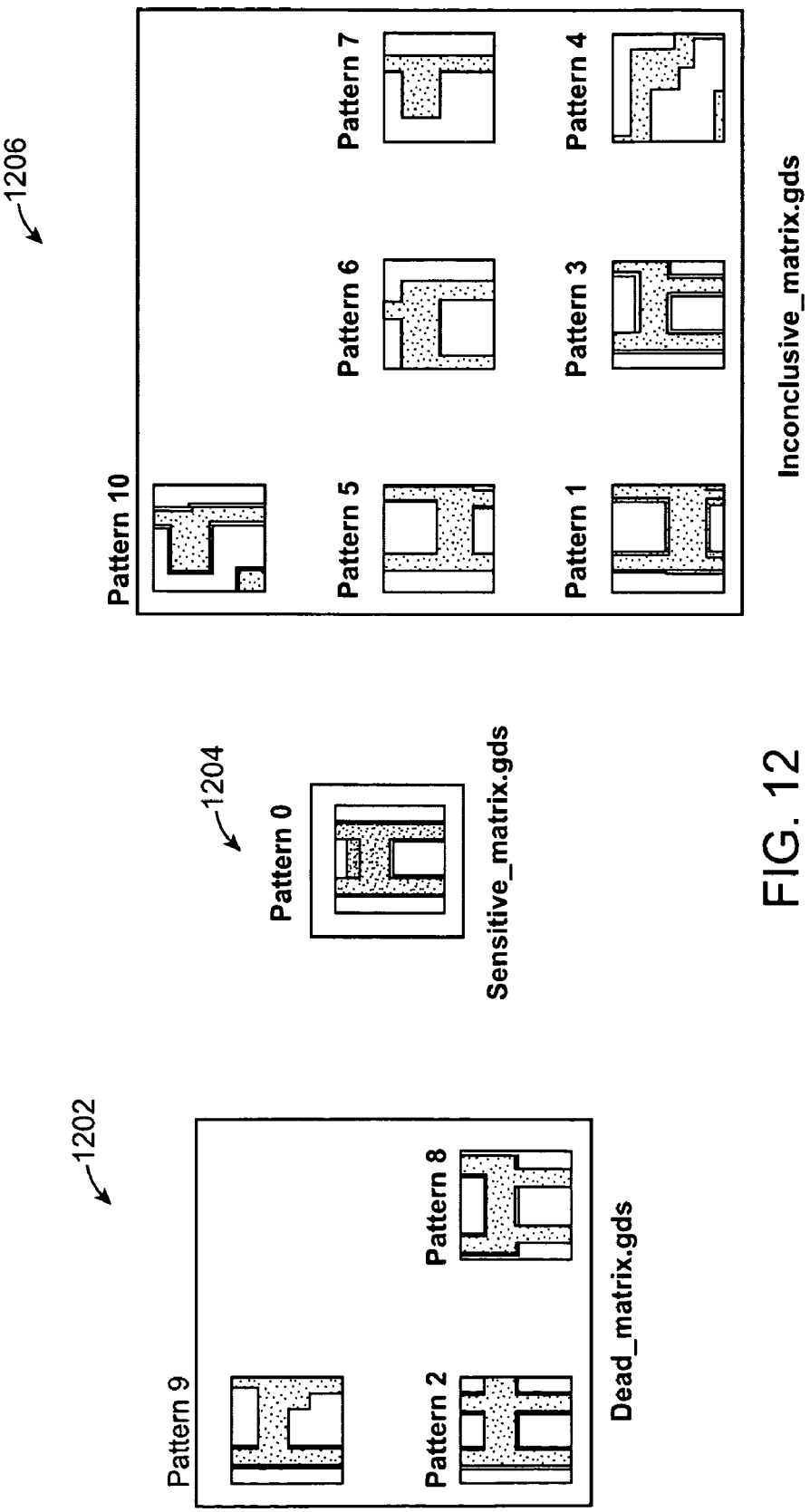
FIG. 12 provides an example approach for representing a matrix of the clusters according to some embodiments of the invention.

FIG. 12 provides an example approach for representing a matrix of the clusters. Group 1202 is a collection of the dead patterns (i.e., patterns 2, 8, and 9) within a single GDS file (i.e., Dead_matrix.gds). Group 1204 is a collection of the sensitive patterns (i.e., pattern 0) within a single GDS file (i.e., Sensitive_matrix.gds). Group 1206 is a collection of the inconclusive patterns (i.e., patterns 1, 3, 4, 5, 6, 7, and 10) within a single GDS file (i.e., Inconclusive_matrix.gds).

Figure 13:
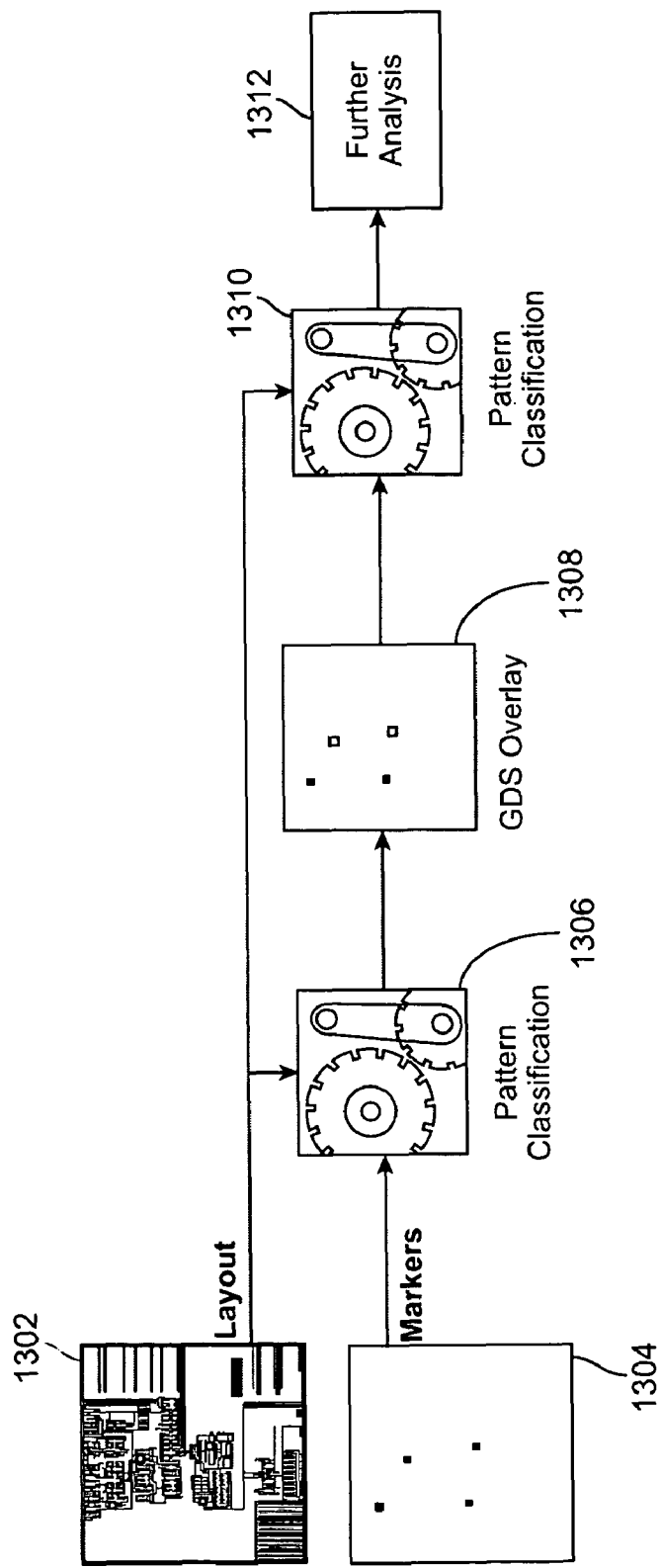
FIG. 13 shows that pattern classification outputs can be used to drive further analysis in other contexts according to some embodiments of the invention.

As shown in FIG. 13, the pattern classification outputs can be used to drive further analysis in any context. The first part of the flow in FIG. 13 was described in detail above, in which the layout data 1302 and the markers 1304 are used to perform pattern classification 1306 to generate pattern classification results, e.g., a set of one or more overlays 1308 for the clusters.

The results of a first pattern classification action 1306 can be used as input to a second pattern classification action 1310. In this example, the layer of the GDS overlay 1308 that corresponds to a pattern is used as the marker filer to the second pattern classification action 1310.

The second pattern classification is performed to provide different analysis with respect to additional contexts 1312 or analysis goals. This is useful, for example, to analyze an inconclusive pattern in a different context 1312 which may be helpful in making a determination as to whether that pattern designated as inconclusive for another context should really be categorized as either dead or sensitive. This may be accomplished in the second pattern classification action 1310 by performing the pattern classification at a larger radius and/or with a different correlation threshold (i.e., either higher or lower thresholds).

The present pattern classification approach can be used in the context of performing 2D or image based rule checking. Conventional DRC is accomplished based upon the mathematical analysis of the geometric properties and configurations of shapes within a layout. For example, a conventional spacing rule check is performed by analyzing whether the spacing distance between the geometric edges of two individual objects meets or exceeds a specified minimum spacing distance. By contrast, 2D or image based rule checking is used to analyze the images, e.g., bitmap images, of portions of the layout to determine whether the images of the objects qualify as meeting or not meeting manufacturing expectations. For example, 2D rules could be configured as a set of "bad" patterns, where 2D rule checking is performed by comparing the patterns in a layout not as individual geometries, but as collective image patterns to be compared against the library of bad patterns to determine whether that particular pattern is a hotspot. One suitable approach for performing 2D DRC is described in co-pending U.S. application Ser. No. 11/207,266, filed on Aug. 18, 2005, which is hereby incorporated by reference in its entirety.

Figure 14:
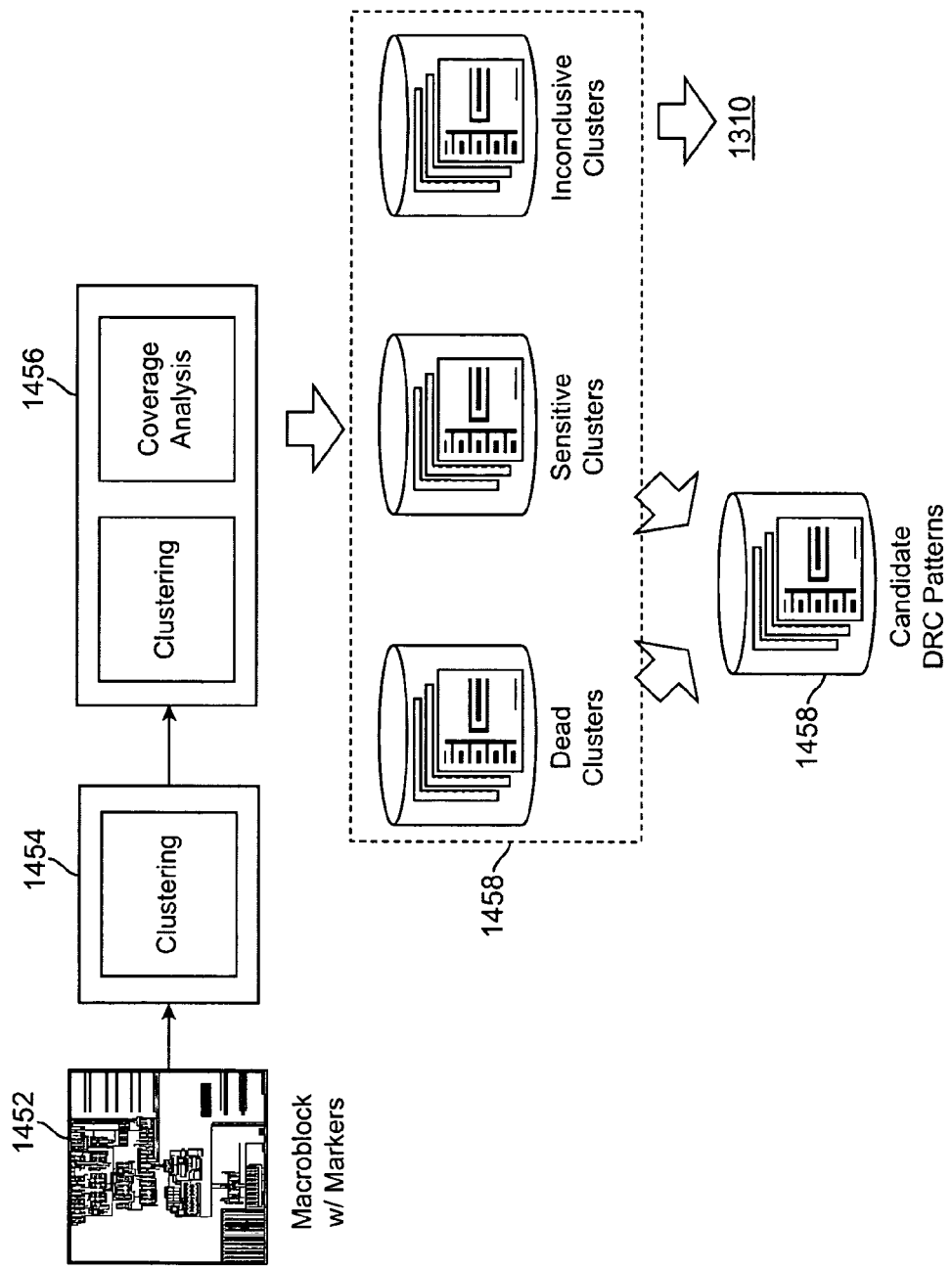
FIGS. 14 and 15 show a flow of a process for using pattern classification in the context of creating rules for performing 2D or image based rule checking according to some embodiments of the invention.
Figure 15:
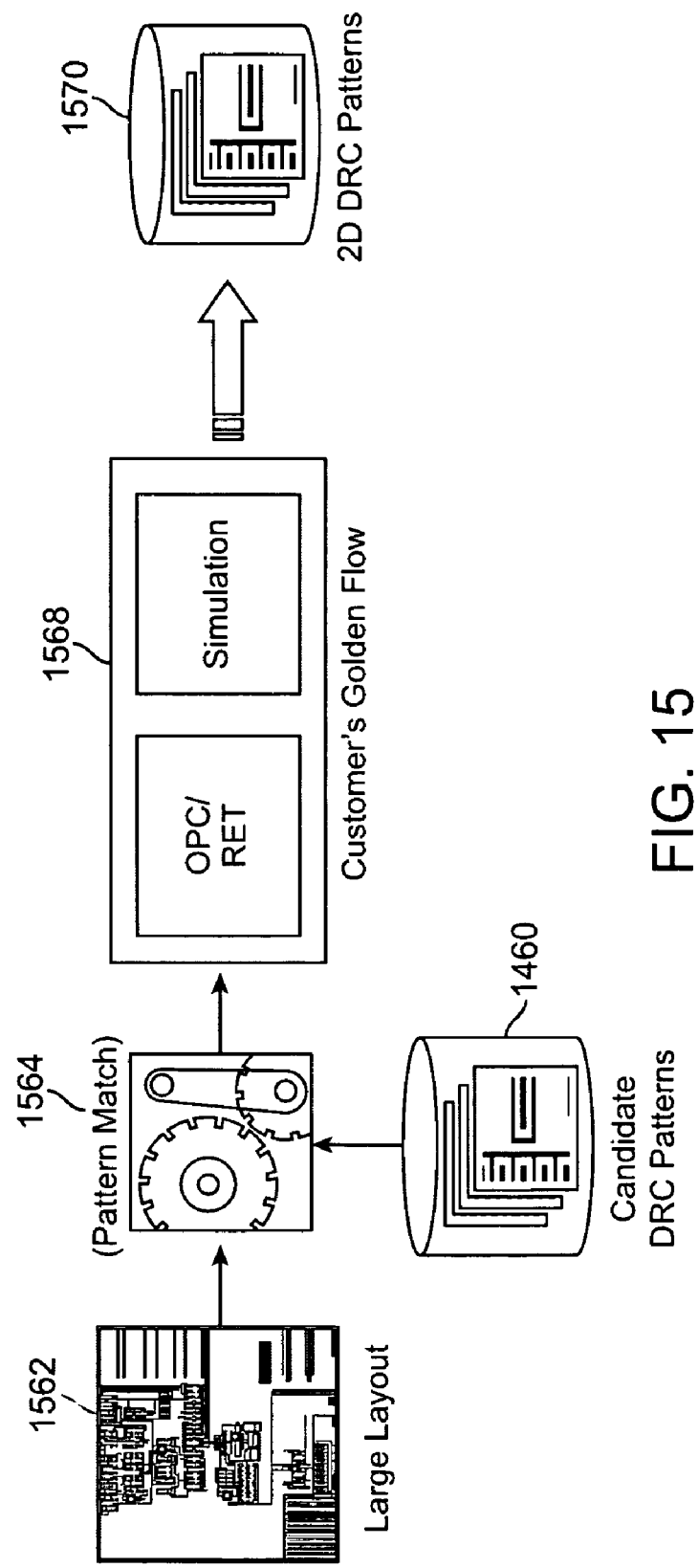

The combination of FIGS. 14 and 15 show a flow of a process for using the present pattern classification approach in the context of creating rules for performing 2D or image based rule checking. At 1452, a layout is received for analysis, e.g., a layout for a macroblock having markers embedded in the layout data. At 1454, fast clustering is performed to quickly establish good coverage filter cut-offs for the analysis. For example, the fast clustering can be performed at small diameter(s) (e.g., ~2-3 pitches) to determine the coverage filter cut-off.

Next, at 1456, clustering and coverage analysis is performed as described above. The clustering and coverage analysis is performed, e.g., to identify dead, sensitive, and inconclusive clusters 1458. The dead and sensitive clusters are analyzed to select candidates for the 2D DRC patterns 1460 and/or determine if other escalation is warranted. For the inconclusive clusters, the process proceeds to 1310 of FIG. 13 to change the context of the analysis. For example, pattern classification can be performed on the inconclusive clusters at larger diameter(s) (e.g., at ~5 pitch).

FIG. 15 shows a flow for validating the candidate 2D DRC patterns 1460. At 1564, regions are identified in the larger layout 1562 that match the candidate 2D DRC patterns 1460. Thereafter, at 1568, a manufacturability assessment is performed on the matched regions of the larger layout. This can be accomplished, for example, by performing OPC/RET and lithography simulation upon the matched regions of the layout. It is noted that this process is typically very compute intensive and costly if performed on the full layout 1562. However, only the smaller set of regions that have been identified through pattern matching 1564 would have to undergo this procedure. The manufacturability assessment step 1568 validates whether or not the matched regions are hotspots Thereafter, at 1570, candidate 2D DRC patterns are verified as 2D DRC patterns if all/most of match regions fail the manufacturability assessment. If a significant number of matches for a candidate 2D DRC pattern are validated as hotspots, then that 2D DRC pattern can be upgraded from a candidate 2D DRC pattern to a confirmed 2D DRC pattern and placed into the 2D DRC pattern database 1570. In other words, the lithography simulation will identify the regions that correspond to areas of likely manufacturing problems and confirm which candidate 2D design rules should be represented as 2D design rules in the 2D rules library.

System Architecture Overview

Figure 16:
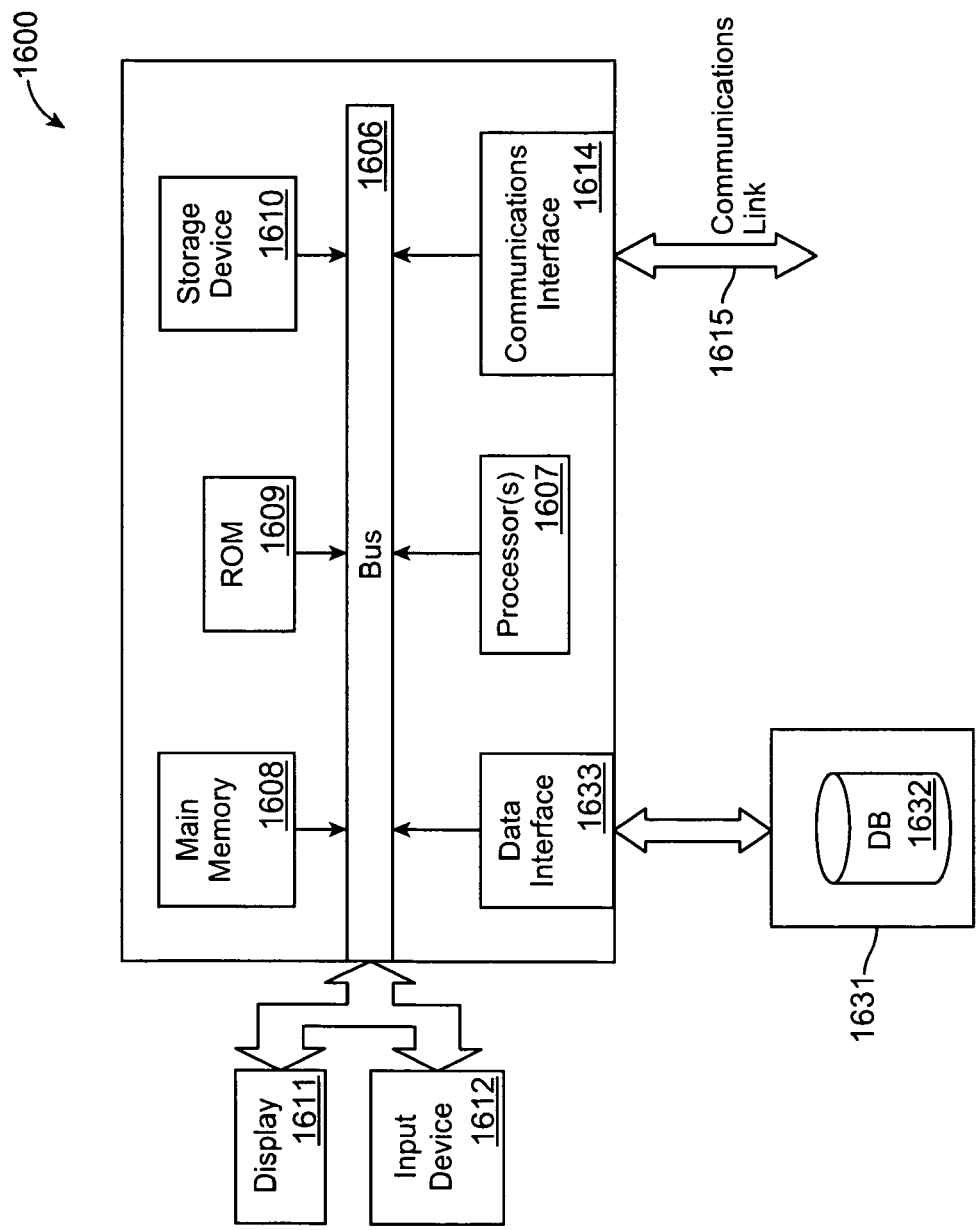
FIG. 16 shows an architecture of an example computing system with which the invention may be implemented.

FIG. 16 is a block diagram of an illustrative computing system 1600 suitable for implementing an embodiment of the present invention. Computer system 1600 includes a bus 1606 or other communication mechanism for communicating information, which interconnects subsystems and devices, such as processor 1607, system memory 1608 (e.g., RAM), static storage device 1609 (e.g., ROM), disk drive 1610 (e.g., magnetic or optical), communication interface 1614 (e.g., modem or Ethernet card), display 1611 (e.g., CRT or LCD), input device 1612 (e.g., keyboard), and cursor control.

According to one embodiment of the invention, computer system 1600 performs specific operations by processor 1607 executing one or more sequences of one or more instructions contained in system memory 1608. Such instructions may be read into system memory 1608 from another computer readable/usable medium, such as static storage device 1609 or disk drive 1610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1607 for execution. Such a medium may take many forms, including but not limited to, non-volatile media and volatile media. Non-volatile media includes, for example, optical or magnetic disks, such as disk drive 1610. Volatile media includes dynamic memory, such as system memory 1608.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1600. According to other embodiments of the invention, two or more computer systems 1600 coupled by communication link 1615 (e.g., LAN, PTSN, or wireless network) may perform the sequence of instructions required to practice the invention in coordination with one another.

Computer system 1600 may transmit and receive messages, data, and instructions, including program, i.e., application code, through communication link 1615 and communication interface 1614. Received program code may be executed by processor 1607 as it is received, and/or stored in disk drive 1610, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method for performing pattern classification of patterns within an integrated circuit design, comprising:
   receiving an integrated circuit design, wherein the integrated circuit design comprises markers corresponding to locations of potential design problems within the integrated circuit design;
   analyzing the integrated circuit design and the markers;
   generating, by using a processor, one or more families of patterns, in which members of a family corresponds to a geometric similarity at locations of the markers; and
   storing information regarding the one or more families of the patterns in a non-transitory computer readable medium or displaying the information on a display.

2. The method of claim 1 in which the markers are based upon manufacturing hotspots identified within the integrated circuit design.

3. The method of claim 2 in which the manufacturing hotspots correspond to at least one of a lithography hotspot, etching hotspot, chemical metal polishing hotspot, or a deposition hotspot.

4. The method of claim 1 in which the one or more families of the patterns is generated based upon maximizing shared central rectangles across a family, allowing for geometric variations within the one or more families, minimizing coverage of non-markers, using tolerances to represent a variation in the patterns, or using image correlation to allow or restrict grouping of the markers.

5. The method of claim 1 in which the one or more families of the patterns are represented as a set of structures corresponding to a pattern.

6. The method of claim 5 in which the set of structures comprise at least one structure having a don't care region associated with the structure, in which the structure corresponds to the pattern if the structure has a boundary that corresponds to the don't care region.

7. The method of claim 1 in which the one or more families of the patterns is generated based upon mirroring or rotational folding.

8. The method of claim 7 in which the mirroring or rotational folding is implemented based upon analysis from a location of a marker, in which objects associated with the marker are analyzed from the location of the marker and incrementally reviewed from a mirrored or rotationally shifted perspective.

9. The method of claim 7 in which any rotational angle is supported for the mirroring or rotational folding.

10. The method of claim 1 in which the one or more families of the patterns is generated based upon translational folding.

11. The method of claim 10 in which the translational folding is performed to group together the patterns which are geometrically similar but for which features within the patterns may be positionally shifted by an acceptable tolerance level.

12. The method of claim 1 in which the one or more families of the patterns is generated based upon image correlation.

13. The method of claim 12 in which the image correlation is performed based upon geometric or lithographic analysis of the patterns to identify patterns that are geometrically similar to one another within a certain correlation tolerance level.

14. The method of claim 12 in which a Boolean OR operation is performed to implement the image correlation.

15. The method of claim 1 in which the one or more families of the patterns is generated based upon edge registration.

16. The method of claim 15 in which a pattern is represented by a set of structures comprising at least one structure having a don't care region associated with an edge for the structure.

17. The method of claim 1 in which the one or more families of the patterns are used as an input to a downstream electronic design tool to implement or verify a design.

18. The method of claim 1 in which the markers associated with a same family are grouped onto a same layer of the integrated circuit design.

19. The method of claim 1 further comprising: gathering statistical data based at least in part upon classification of the patterns.

20. The method of claim 19 in which the statistical data comprises at least one of number of matches of a pattern family within a layout, number of markers covered by the matches, or a marker coverage ratio.

21. The method of claim 19 in which clusters of the patterns are organized into categories, wherein the categories include at least one of a first category in which every or substantially every match in a layout covers a marker, a second category in which a marker coverage ratio is greater than or equal to a specified tolerance, a third category in which the marker coverage ratio is less than the specified tolerance, or a fourth category for when a cluster is covered by too few markers to provide statistically reliable conclusions.

22. The method of claim 19 in which the statistical data is used to determine whether a pattern is conclusive or inconclusive with respect to a given context.

23. The method of claim 19 in which the one or more families of the patterns are used as candidate patterns for rules for 2D design rule checking.

24. A computer program product that includes a non-transitory computer readable medium, the non-transitory computer readable medium comprising a plurality of computer instructions which, when executed by a processor, cause the processor to execute performing a process for performing pattern classification of patterns within an integrated circuit design, the process comprising:
receiving an integrated circuit design, wherein the integrated circuit design comprises markers corresponding to locations of potential design problems within the integrated circuit design;
analyzing the integrated circuit design and the markers;
generating one or more families of patterns, in which members of a family corresponds to a geometric similarity at locations of the markers; and
storing information regarding the one or more families of the patterns or displaying the information on a display.

25. The computer program product of claim 24 in which the one or more families of the patterns is generated based at least in part upon maximizing shared central rectangles across a family, allowing for geometric variations within the one or more families, minimizing coverage of non-markers, using tolerances to represent a variation in the patterns, or using image correlation to allow or restrict grouping of the markers.

26. The computer program product of claim 24 in which the process further comprises gathering statistical data based at least in part upon classification of the patterns in which the statistical data comprises at least one of number of matches of a pattern family within a layout, number of markers covered by the matches, or a marker coverage ratio.

27. A system for performing pattern classification of patterns within an integrated circuit design, comprising:
a process for executing a sequence of computing instructions; and
a memory for holding the computing instructions and results of executing the computing instructions, in which the computing instructions comprise instructions for receiving an integrated circuit design, wherein the integrated circuit design comprises markers corresponding to locations of potential design problems within the integrated circuit design, analyzing the integrated circuit design and the markers, and generating one or more families of patterns, in which members of a family corresponds to a geometric similarity at locations of the markers.

28. The system of claim 27 in which the one or more families of the patterns is generated based at least in part upon maximizing shared central rectangles across a family, allowing for geometric variations within the one or more families, minimizing coverage of non-markers, using tolerances to represent a variation in the patterns, or using image correlation to allow or restrict grouping of the markers.

29. The system of claim 27 in which the computing instructions further comprises gathering statistical data based at least in part upon classification of the patterns in which the statistical data comprises at least one of number of matches of a pattern family within a layout, number of markers covered by the matches, or a marker coverage ratio.

* * * * *